March 28, 1961 H. T. SPARROW 2,977,050
THERMOELECTRICALLY ENERGIZED CONTROL APPARATUS
Filed July 8, 1957 2 Sheets-Sheet 1

INVENTOR.
HUBERT T. SPARROW
BY Joseph E. Ryan
ATTORNEY

INVENTOR.
HUBERT T. SPARROW
BY Joseph E. Ryan
ATTORNEY

United States Patent Office 2,977,050
Patented Mar. 28, 1961

2,977,050

THERMOELECTRICALLY ENERGIZED CONTROL APPARATUS

Hubert T. Sparrow, Minneapolis, Minn., assignor to Minneapolis-Honeywell Regulator Company, Minneapolis, Minn., a corporation of Delaware Filed July 8, 1957, Ser. No. 670,519

15 Claims. (Cl. 236—1)

The present invention relates to a control and safety device, and more specifically relates to a thermocouple type flame detection device integrally connected with a valve controller.

Thermocouples of conventional construction have been used extensively in the safety control field to monitor pilot lights. A conventional thermocouple when inserted in a pilot light generates a small amount of electric potential which is utilized in a control system to provide a standby condition for a second controlled device. This type of arrangement is normally found in conventional heating systems where the thermocouple monitors the pilot light and provides the necessary standby potential for the main fuel control valve. Upon energization of the main fuel control valve the fuel is released into the combustion chamber and the pilot light ignites the fuel on each heating cycle. If for some reason, the pilot light is extinguished, the output of the thermocouple is lost and the loss of this potential deactivates or disables the main fuel control valve so that it will not open when the heating system calls for the next heating cycle. The arrangement just described normally is satisfactory but due to the time lag in the cooling of the thermocouple after the pilot light has been extinguished, there is the possible danger of the main fuel valve being opened while the pilot light is out. This is true since the thermocouple has an output which decays at some given rate after the flame of the pilot light has been lost. It can therefore be seen that if the main fuel valve were to be energized immediately upon failure of the pilot flame that it would be possible for a sufficient potential to still exist at the thermocouple output terminals to cause the main fuel valve to be operative even though there was no pilot flame available to ignite the fuel in the combustion chamber.

The present invention utilizes a unique type of thermocouple and associated control device, and it is an object of this invention to disclose a safety control apparatus which is exceedingly rapid in action.

A further object of the present invention is to disclose a device which has a minimum of moving parts and therefore is both reliable and inexpensive.

Still a further object is to disclose a control apparatus wherein one of the materials that makes up the thermocouple junction also is utilized to directly operate the control apparatus.

These and other objects will become apparent when the figures disclosed on the associated two sheets of drawings have been fully considered, wherein.

To obtain an understanding of the operation of the present device the theory behind two of the functions will be explained. The first of these is the broad teaching of a thermocouple. A thermocouple is normally composed of two dissimilar metals which have two common junctions. The common junctions are displaced in space so that one of the junctions may be heated while the other junction may be kept at a somewhat lower temperature. When two dissimilar metals are treated in this manner an electric potential is developed between the hot and cold junctions and upon closing this circuit a current will flow. It should be understood that while the normally constructed thermocouple is composed of two dissimilar metals in their solid state that a thermocouple can be built by the use of two dissimilar metals, one of which is in its solid state and the other of which is in its liquid or gaseous state. In the present application the thermocouple which is being used is composed of a first metal in its solid state and a second metal in either its fluid or gaseous state. More specifically the second metal would be a conductive liquid metal such as mercury, sodium, potassium, or a sodium-potassium alloy. Mercury and the sodium-potassium alloy are normally liquid at conventional ambient temperatures and readily form junctions.

It can thus be seen that a thermocouple can be readily built by properly confining a conductive liquid metal in an insulated metal container having the properly isolated electrical junctions of the two dissimilar metals.

The second principle which must be understood to appreciate the present invention is that a conductive liquid or fluid may be moved under the influence of an electric current and a magnetic field which are mutually perpendicular to one another. This principle was recognized by Faraday, and devices which move conductive fluid in this manner are normally referred to as Faraday pumps. The Faraday pump has become quite common in laboratory work and in connection with the movement of liquid sodium and liquid sodium-potassium in nuclear reactors. Basically the Faraday pump uses the induction motor principle, that is, the conductive liquid is considered to be a wire or conductor suspended in a magnetic field and has a current passed mutually perpendicular to the length of the conductor and the magnetic field. Under these conditions a force is induced in the conductor which tends to move it in a direction which is mutually perpendicular to the current and flux. This force, when applied to a liquid conductor, propels the liquid conductor in the same manner as a conventional pump.

The ideas of the use of a thermocouple of the above described nature and a Faraday pump to provide a control apparatus of a very novel nature will be described in detail below.

Figure 3:
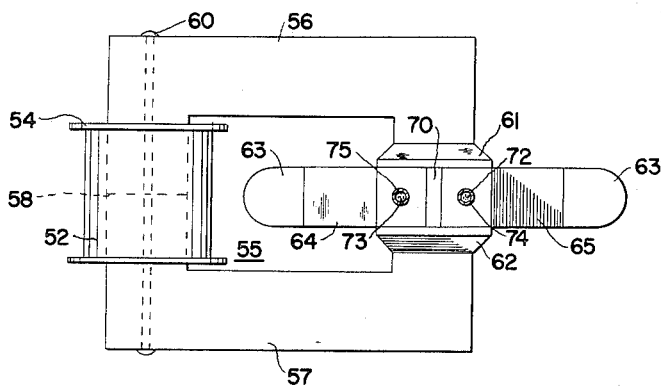
Figure 3 is a top view of a portion of the control apparatus shown in Figure 1 along lines 3—3.
Figure 4:
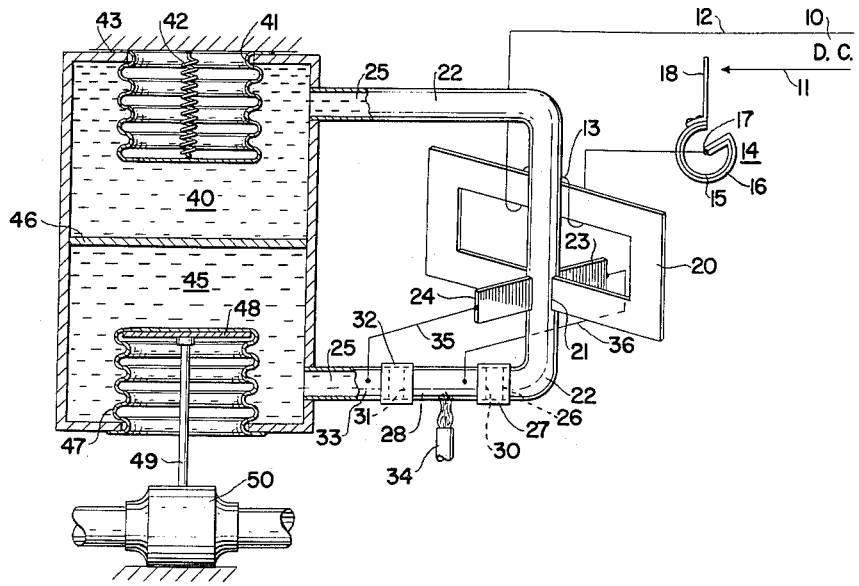
Figure 4 is a partially sectioned schematic representation of a second configuration which embodies the present invention.

In an effort to more fully understand the operation and construction of the preferred embodiment of the present device, a highly simplified schematic representation of a unit has been presented in Figure 4. The unit presented in Figure 4 is primarily included to provide a means of readily explaining the construction and operation of the novel control device disclosed. After a complete description of the construction and operation of the device of Figure 4 the preferred embodiment disclosed in Figures 1 through 3 will be described in detail.

In Figure 4, there is disclosed a direct current source 10 which is supplied by conductors 11 and 12 to a coil 13 through a bimetal thermostat generally shown at 14. The bimetal thermostat 14 is of any conventional construction and can be considered as being formed of two dissimilar metals 15 and 16 which have a central point 17 fixedly mounted in space. Upon a change of temperature near the thermostat 14 the thermostat switch arm 18 is moved. The switch arm 18 can contact the conductor 11 and thereby complete a direct current circuit to the coil 13. It is obvious therefore that the present device can be temperature controlled, but it is understood that the thermostat 14 could be replaced by any convenient control device that would be suitable for the particular application involved. The coil 13 is wrapped about a C-shaped magnetic structure 20 which has an opening at 21. The opening 21 is placed on opposite sides of a tube 22 of a metallic but nonmagnetic material. The tube 22 further has two electrodes 23 and 24 inserted into the sides of the tube. While it has not been illustrated in the present disclosure, the electrodes 23 and 24 are electrically insulated from the tube 22 for a purpose which will become apparent later in the present disclosure. The opening 21 in the magnetic structure 20 is perpendicular to a line through electrodes 23 and 24 and is also substantially perpendicular to the axis of tube 22.

The tube 22 contains a conductive liquid metal or fluid 25. With the conductive fluid in tube 22 all of the conditions have been established to provide a pump of the Faraday type. If the thermostat 14 closed the contact between conductor 11 and arm 18, a field would be established in the magnetic structure 20 by means of coil 13. It is obvious therefore that with the magnetic flux existing in the structure 20 and a conductive fluid 25 located in the tube 22 that if a current were passed between electrodes 23 and 24 that a pumping pressure would be developed which would impel the fluid 25 to move in the tube 22. The means of obtaining the necessary current for electrodes 23 and 24 will be explained below.

Tube 22 has an end 26 which is sealed in a collar 27 of ceramic or other insulating type of material. The collar 27 in turn is connected to a tube 28 and is sealed thereto in a fluid type manner. The end 30 of tube 28 is separated from the end 26 of tube 22 and therefore a complete electrical circuit does not exist between the tubes 22 and 28 unless the circuit exists through some means other than the tubing. The tube 28 further has an end 31 which is sealed in a second ceramic or insulating collar 32. The collar 32 further has its left hand side closed by a tube 33 of a material similar to the sections of tubes 28 and 22. It will become apparent that with the present construction the section of tube 28 is electrically isolated from the sections of tube 22 and 33. This electrical separation is complete only to the extent that a conductive fluid 25 is not present. With the conductive fluid 25 present, however, the tube sections 33, 28, and 22 are interconnected through the conductive fluid. It will thus become obvious that the tube sections 22 and 28, or sections 28 and 33, form two junctions between two dissimilar metals. With this arrangement a thermocouple has been provided. If a flame 34 is provided to heat the tube section 28 it becomes apparent that a potential difference will be established between the tube section 28 and that of the tube sections 33 or 22. This difference in potential can then be utilized by connecting electrode 24 to tube 33 by means of conductor 35 and by connecting electrode 23 to tube section 28 by conductor 36. It is thus seen that electrodes 23 and 24 are provided with a source of electric potential whenever a flame exists adjacent to the tube section 28. As long as the flame 34 remains against the tube section 28 there is current flowing from electrode 23 to 24 and thence through conductor 35 to tube 33, conductive fluid 25, tube section 28, conductor 36 back to electrode 23 operates in conjunction with any flux which might exist in the magnetic structure 20. Under these circumstances the device disclosed would create a pumping pressure against the contained fluid 25.

The thermocouple which has been described as activating the presently described Faraday pump can be used to develop useful motion for operating some external device. This is accomplished by connecting tube 22 to a chamber generally shown at 40. This chamber has a bellows 41 which seals one side of the chamber 40 and in effect creates a chamber of variable volume. The bellows 40 has attached to one side thereof a spring 42 which has its opposite side attached to any convenient fixed structure 43. It is obvious that if the conductive fluid 25 is removed from chamber 40 by means of the tube 22 that the bellows 41 will be caused to expand against the spring 42. A use for the energy stored in spring 42 will become apparent with the subsequent description of the overall device.

A second chamber 45 is provided adjacent the chamber 40 and is separated from it by a fixed wall 46. The chamber 45 has one end sealed by a bellows 47 and the bellows 47 has a plate 48 attached rigidly thereto. The plate 48 is rigidly attached to a shaft 49 which is then in turn connected to a device to be operated 50. Tube 33 joins into the side of the chamber 45 and connects the overall fluid system thereto. It becomes apparent that if the fluid 25 is moved in tube 22 from the upper chamber 40 it must pass into the lower chamber 45. By adding fluid to chamber 45 the bellows 47 is compressed and the plate 48 moves the shaft 49 downward operating device 50. If for some reason the pumping pressure developed in tube 22 is lost, the energy stored in spring 42 will tend to collapse bellows 41 and thereby move fluid from chamber 45 to chamber 40. The movement of the fluid 25 from chamber 45 to 40 returns chamber 45 to its uppermost position and thereby provides the necessary return motion for the plate 48 and the shaft 49 to return the device 50 to its initial position.

It will thus be seen that if a flame 34 exists and the thermostat 14 completes a circuit between the direct current source 10 and coil 13 that a pumping action will be obtained and will result in the movement of shaft 49 to operate device 50. If either the flame 34 or the energization of coil 13 is lost the energy stored in spring 42 will return the device to its de-energized or standby condition. It is thus apparent that whenever a flame 34 exists the thermostat has an off-on control over device 50, which could be a fuel supply valve. It is further evident that if the flame 34 should go out for any reason, that the pumping device would cease to operate and the energy stored in spring 42 would return the device 50 to its initial position. This initial position would normally be the closed position for a fuel supply valve and therefore the failure of the flame 34 would shut the fuel supply device 50 off.

A further important feature of the present device is that upon failure of the flame the stored energy in spring 42 tends to move the conductive fluid 25 in the tubes 33, 38 and 22. Movement of this fluid causes the fluid to pass the hot junction of the thermocouple device and thereby more rapidly cools this junction. In effect the cooling of the thermocouple junction is cumulative in end results. Once the flame 34 has been lost the cold fluid is caused to pass by the hot junction in tube 28 and thereby rapidly cools the device. This brings about an almost instantaneous shutdown of the device and allows the device 50 to be closed very rapidly.

The device just disclosed in detail has been illustrative of the principles involved and a preferred embodiment disclosed in Figures 1 through 3 will be described in detail. The embodiment disclosed in Figures 1 to 3 utilizes exactly the same principles of construction and operation, but is of a form substantially different in appearance.

Figure 1:
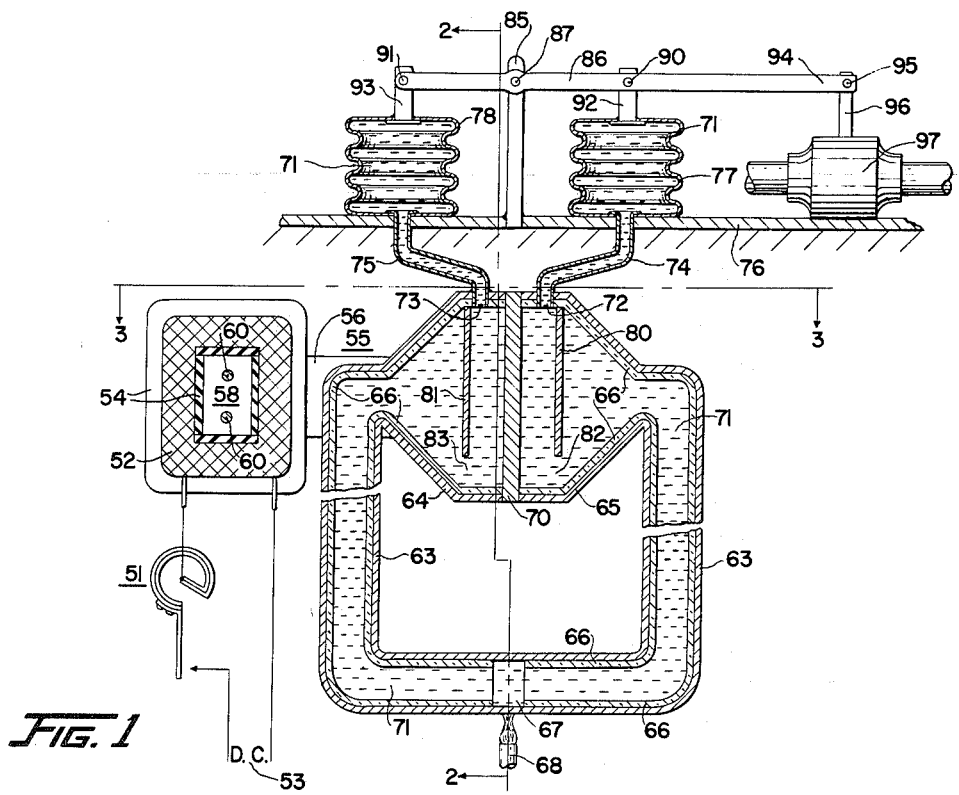
Figure 1 is a cross section of the safety control apparatus disclosing both the thermocouple sections and the control sections.

In Figure 1 there is disclosed a thermostat 51 which completes a circuit to a coil 52 from a direct current source 53. Again it is noted that the thermostat 51 could be replaced by any convenient type of control means. The coil 52 is wound on an insulating bobbin 54 and is of conventional design. The bobbin 54 is placed about a magnetic structure generally shown at 55. The magnetic structure 55 is composed of two identical pieces 56 and 57 which have a joint 58 which occurs inside of bobbin 54. The two sections 56 and 57 are held together by two rivets 60, or any other convenient means. It is obvious that with the present arrangement that the two magnetic sections 56 and 57 can be conveniently slipped into the core 54 of the coil 52 and the two rivets 60 hold the unit in its proper assembled relationship. The portions 56 and 57 of the magnetic structure 55 further have two pole pieces 61 and 62 which are of a shape that conveniently covers the necessary section of the device, and it is pointed out that the size and configuration of the pole pieces 61 and 62 is chosen to suit the particular application involved as will become obvious from the complete description of the device. When the thermostat 51 is closed completing the circuit to coil 52 it is obvious that a magnetic flux exists between the poles 61 and 62 and this flux corresponds to the flux which was generated in the magnetic structure 20 shown in Figure 4.

A metallic tube 63 is formed into the general shape of a C and for the most part is circular in cross section. The tube 63 has two ends 64 and 65 which have been flattened to form two rectangular portions. The rectangular section of the end 64 can best be seen in Figure 2. The interior of tube 63 is coated with an insulative material as at 66. This insulating coating could be in the nature of a ceramic and covers the entire surface of the inside of tube 63 with the exception of section 67. The section 67 of the tube 63 has been left uninsulated to form the hot junction of the thermocouple needed for operation of the overall device. The section 67 is therefore heated by flame 68 in the same manner as the flame 34 heated the tube section 28 in Figure 4.

The ends 64 and 65 of the tube 63 are completely sealed by inserting a metal plate 70 and welding or soldering the plate 70 over the rectangular cross sections of the ends 64 and 65. The plate 70 is in good electrical contact with the ends 64 and 65 and the plate 70 therefore forms the cold junction of the thermocouple section of the device. A conductive fluid 71 is added to this structure through either of two holes 72 or 73. The holes 72 and 73 are then in turn connected to two tubes 74 and 75. The tubes 74 and 75 pass through a fixed structure or platform 76 into bellows 77 and 78. It becomes obvious that bellows 77 and 78 complete the sealing of the fluid system and their operation is much the same as bellows 41 and 47 in Figure 4.

Inside of the tube 63 there are placed two electrically conductive baffles 80 and 81. These two baffles must be of a material which is at least as conductive as the fluid 71 and the baffles fill substantially the entire ends 64 and 65 of tube 63. The baffles however have openings 82 and 83 which allow for the completion of the fluid circuit of the device.

Attached to structure 76 is a support post 85 which in turn supports a lever arm 86 in a pivotal relation at 87. The arm 86 is connected by pivotal joints 90 and 91 to the tops of bellows 77 and 78 by means of rods 92 and 93. It becomes obvious that if bellows 77 is caused to collapse that it forces the conductive fluid 71 therefrom into the end 65 of the tube 63. The fluid 71 then is caused to flow around in tube 63 to end 64 and thence into tube 75 and bellows 78. This will cause the expansion of bellows 78. With the collapse of bellows 77 and the expansion of bellows 78 the arm 86 is caused to rock in a downward direction. The end 94 of the arm 86 is pivotally attached at 95 to a shaft 96. Shaft 96 is in turn connected to a device to be controlled 97. The shaft 96 and device to be controlled 97 correspond to the shaft 49 and the device 50 of Figure 4.

Figure 2:
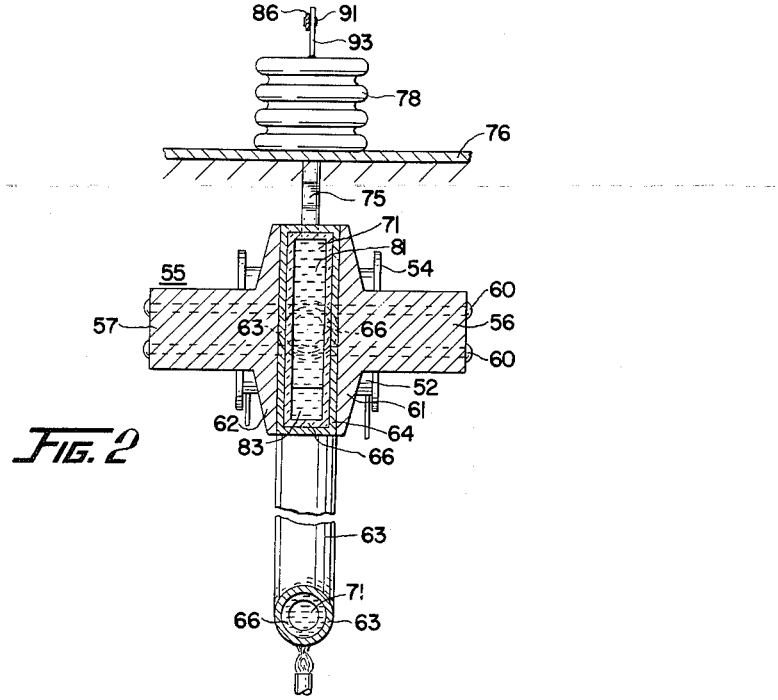
Figure 2 is a cross section of Figure 1 along lines 2—2.

The operation of the device disclosed in Figures 1 to 3 is substantially the same as that disclosed in Figure 4 and will be described in some detail herein. As the flame 68 heats the junction between the conductive fluids 71 and the bare section 67 there is a generation of electric potential between the section 67 and the plate 70 since the conductive fluid 71 is a dissimilar metal to the container or tube 63. A current will therefore pass through the conductive fluid between these two junctions and complete its circuit through the tube 63. It is thus apparent that a current will flow across the barriers 80 and 81 when passing from hot junction section 67 to the cold junction plate 70 by means of the conductive fluid. The current flowing across the barriers 80 and 81 to the plate 70 are perpendicular to the flux which is generated between the pole pieces 61 and 62 and therefore it can be seen that the conditions needed to provide a Faraday pump are available. In considering the pumping action, if a current and flux exist mutually perpendicular, a force is created in the conductive fluid which is perpendicular to the flux and the currents present. This would mean that if in the end 65 of tube 63 there is a force directed downward towards opening 82 from the opening 72, the force would be carried on through the tube 63 and this force would tend to move the conductive fluid 71 in a clockwise direction. At this same instant there would be a current passing between the barrier 81 and the plate 70 and this current is also mutually perpendicular to the same flux passing between poles 61 and 62. Since the current flowing from barrier 81 to plate 70 is opposite in direction to that flowing between the barrier 80 and the plate 70 there is a force produced in an upward direction between opening 83 and opening 73. This will tend to carry the fluid 71 around in a clockwise direction and move it up into tube 75 and thence into bellows 78. It will be obvious therefore that the fluid is moved from bellows 77 through the pump and thermocouple device into bellows 78 and thereby the arm 86 is operated clockwise about pivot 87. This again operates the device 97 by means of the shaft 96 and the previously described mechanical linkage. It will be obvious that upon loss of the flame 68 that the thermocouple action will start to decay. As soon as this action starts to decay the pumping action of the device will also start to decay. Once this decay in force is established the resilience of the bellows 77 and 78 will tend to start a flow of fluid in the reverse direction from which it originally was initated. This will cause the fluid 71 to pass the junction 67 and cool the junction rapidly. Again this action is cumulative in effect in that as the junction 67 is cooled by the movement of the fluid 71 the force generated in the device decreases which in turn again allows for a faster movement of the fluid 71 past the heated junction.

It becomes obvious that the principles of operation of the device disclosed in Figures 1–3 is the same as that in Figure 4 but only differs from it in physical form. It is apparent that many modifications could be made within the scope and intent of the present invention and the two embodiments disclosed in the present application have been illustrative only. The applicant wishes to be limited in scope only by the appended claims.

I claim as my invention:

1. In an apparatus of the class described: thermocouple means having hot and cold junctions; one said junction formed between a conductive fluid and metallic enclosure means; means for applying heat to said hot junction and thereby generating a potential between said hot and cold junctions resulting in a current flow between said junctions in said conductive fluid; magnetic flux generating means adjacent said enclosure means and passing said flux across said fluid; and a variable volume chamber connected to said enclosure means and containing said fluid; said current and said flux creating a force in said fluid to propel said fluid in said enclosure means; said movement of said fluid changing the volume of said variable volume chamber.

2. In an apparatus of the class described: thermocouple means having hot and cold junctions; one said junction formed between a liquid metal and metallic enclosure means; means for applying heat to said hot junction and thereby generating a potential between said hot and cold junctions resulting in a current flow between said junctions in said liquid metal; magnetic flux generating means adjacent said enclosure means and passing said flux across said liquid metal; and a variable volume chamber connected to said enclosure means and containing said liquid metal; said current and said flux creating a force in said liquid metal to propel said liquid metal in said enclosure means; said movement of said liquid metal changing the volume of said variable volume chamber.

3. In an apparatus of the class described: a device to be operated; thermocouple means having hot and cold junctions; one said junction formed between a conductive liquid metal and metallic enclosure means; means for applying heat to said hot junction and thereby generating a potential between said hot and cold junctions resulting in a current flow between said junctions in said liquid metal; controllable magnetic flux generating means adjacent said enclosure means and passing said flux across said liquid metal; two variable volume chambers connected to said enclosure means and containing said liquid metal; and connection means connecting at least one of said chambers and said device; said current and said flux creating a force in said liquid metal to propel said liquid metal in said enclosure means; said movement of said liquid metal differentially changing the volume of said variable volume chambers to operate said device.

4. In a thermocouple pilot safety control of the class described: a device to be operated; thermocouple means having hot and cold junctions; one said junction formed between a conductive liquid metal and metallic enclosure means; means for applying heat to said hot junction and thereby generating a potential between said hot and cold junctions resulting in a current flow between said junctions in said conductive liquid metal; controllable magnetic flux generating means adjacent said enclosure means and passing said flux across said liquid metal; two variable volume chambers biased to a first position; said chambers connected to said enclosure means and containing said liquid metal; and connection means connecting at least one of said chambers and said device; said current and said flux creating a force in said liquid metal to propel said liquid metal in said enclosure means; said movement of said fluid differentially changing the volume of said variable volume chambers to operate said device; said variable volume chambers further being returned to said first position by said bias upon loss of said force.

5. In apparatus of the class described: thermocouple means including metal enclosure means containing a conductive fluid; said enclosure means having two electrically independent junctions formed between said metal and said fluid; current conduction means; heat means applied to one of said junctions to generate a potential between said electrically independent junctions; said potential causing a current to flow through said current conduction means between said junctions and in said fluid; magnetic flux generating means adjacent said enclosure means and passing a flux across said fluid; and a variable volume chamber connected to said enclosure means and containing said fluid; said current and said flux creating a force in said fluid to propel said fluid in said enclosure; said movement of said fluid changing the volume of said variable volume chamber.

6. An apparatus of the class described: a device to be operated; thermocouple means including metal enclosure means containing a conductive fluid; said enclosure means having two electrically independent junctions formed between said metal and said fluid; current conduction means; heat means applied to one of said junctions to generate a potential between said electrically independent junctions; said potential causing a current to flow through said current conduction means between said junctions and in said fluid; magnetic flux generating means adjacent said enclosure means and passing a flux across said fluid; a variable volume chamber connected to said enclosure means and containing said fluid; and connection means connecting said chamber and said device; said current and said flux creating a force in said fluid to propel said fluid in said enclosure; said movement of said fluid changing the volume of said variable volume chamber to operate said device.

7. An apparatus of the class described: thermocouple means including metal enclosure means containing a conductive liquid metal; said enclosure means having two electrically independent junctions formed between said metals; current conduction means; heat means applied to one of said junctions to generate a potential between said electrically independent junctions; said potential causing a current to flow through said current conduction means between said junctions and in said liquid metal; magnetic flux generating means adjacent said enclosure means and passing a flux across said liquid metal; and a variable volume chamber connected to said enclosure means and containing said liquid metal; said current and said flux creating a force in said liquid metal to propel said liquid metal in said enclosure; said movement of said liquid metal changing the volume of said variable volume chamber.

8. In apparatus of the class described: a device to be operated; thermocouple means including metal enclosure means containing a conductive liquid metal; said enclosure means having two electrically independent junctions formed between said metals; current conductive means; heat means applied to one of said junctions to generate a potential between said electrically independent junctions; said potential causing a current to flow through said current conduction means between said junctions and in said liquid metal; magnetic flux generating means adjacent said enclosure means and passing a flux across said liquid metal; a variable volume chamber connected to said enclosure means and containing said liquid metal; and connection means connecting said chamber and said device; said current and said flux creating a force in said liquid metal to propel said liquid metal in said enclosure; said movement of said liquid metal changing the volume of said variable volume chamber to operate said device.

9. In apparatus of the class described: a device to be operated; thermocouple means including metal enclosure means containing a conductive liquid metal; said enclosure means having two electrically independent junctions formed between said metals; current conduction means; heat means applied to one of said junctions to generate a potential between said electrically independent junctions; said potential causing a current to flow through said current conduction means between said junctions and in said liquid metal; magnetic flux generating means adjacent said enclosure means and passing a flux across said liquid metal; a plurality of variable volume chambers connected to said enclosure means and containing said liquid metal; and linkage means connecting at least one of said chambers and said device; said current and said flux creating a force in said liquid metal to propel said liquid metal in said enclosure; said movement of said liquid metal differentially changing the volume of said variable volume chambers to operate said device.

10. An apparatus of the class described: a device to be operated; thermocouple means including metal enclosure means containing a conductive liquid metal; said enclosure means having two electrically independent junctions formed between said metals; current conduction means; heat means applied to one of said junctions to generate a potential between said electrically independent junctions; said potential causing a current to flow through said current conduction means between said junctions and in said liquid metal; magnetic flux generating means adjacent said enclosure means and passing a flux across said liquid metal; a plurality of variable volume chambers connected to said enclosure means and containing said liquid metal; said chambers being biased to a first volume; and linkage means connecting at least one of said chambers and said device; said current and said flux creating a force in said liquid metal to propel said liquid metal in said enclosure; said movement of said liquid metal changing the volume of said variable volume chambers to operate said device; said variable volume chambers further returned to said first volume by said bias upon loss of said force.

11. A thermocouple pilot safety control of the class described: a device to be operated; thermocouple means including metal enclosure means containing a conductive liquid metal; said enclosure means having two electrically independent junctions formed between said metals; current conduction means; heat means applied to one of said junctions to generate a potential between said electrically independent junctions; said potential causing a current to flow through said current conduction means between said junctions and in said liquid metal; thermostatically controlled magnetic flux generating means adjacent said enclosure means and passing a flux across said liquid metal perpendicular to said current flow; a plurality of variable volume chambers connected to said enclosure means and containing said liquid metal; said chambers being biased to a first volume; and linkage means connecting at least one of said chambers and said device; said current and said flux creating a force in said liquid metal to propel said liquid metal in said enclosure; said movement of said liquid metal differentially changing the volume of said variable volume chambers to operate said device; said variable volume chambers further returned to said first volume by said bias upon loss of said force.

12. In apparatus of the class described; thermocouple means including a metal enclosure having an electrically insulated lining; said enclosure containing a conductive liquid metal and having two electrically independent junctions formed between said metals; two current conducting baffle plates between said junctions; heat means applied to one of said junctions to generate a potential between said electrically independent junctions; said potential causing a current to flow between said junctions by way of said liquid metal and said baffles; magnetic flux generating means adjacent said enclosure means and passing a flux across said liquid metal substantially perpendicular to said current flow; and two chambers, at least one of which being variable in volume, connected to said enclosure means and containing said liquid metal; said current and said flux creating a force in said liquid metal to propel said liquid metal in said enclosure; said movement of said liquid metal changing the volume of said variable volume chamber.

13. In a thermocouple pilot safety control of the class described: a device to be operated; thermocouple means including a metal enclosure having an electrically insulated lining; said enclosure containing a conductive liquid metal and having two electrically independent junctions formed between said metals; two current conducting baffle plates between said junctions; heat means applied to one of said junctions to generate a potential between said electrically independent junctions; said potential causing a current to flow between said junctions by way of said liquid metal and said baffles; thermo-statically controlled magnetic flux generating means adjacent said enclosure means and passing a flux across said liquid metal substantially perpendicular to said current flow; two chambers, at least one of which being variable in volume, connected to said enclosure means and containing said liquid metal; and connection means connecting said variable volume chamber and said device; said current and said flux creating a force in said liquid metal to propel said liquid metal in said enclosure; said movement of said liquid metal changing the volume of said variable volume chamber to operate said device.

14. A thermocouple pilot safety control of the class described: a device to be operated; thermocouple means including metal enclosure means containing a conductive liquid metal; said enclosure means having two electrically independent junctions formed between said metals; current conduction means; heat means applied to one of said junctions to generate a potential between said electrically independent junctions; said potential causing a current to flow through said current conduction means between said junctions and in said liquid metal; magnetic flux generating means adjacent said enclosure means and passing a flux across said liquid metal perpendicular to said current flow; a plurality of variable volume chambers connected to said enclosure means and containing said liquid metal; said chambers being biased to a first volume; and linkage means connecting at least one of said chambers and said device; said current and said flux creating a force in said liquid metal to propel said liquid metal in said enclosure; said movement of said liquid metal differentially changing the volume of said variable volume chambers to operate said device; said variable volume chambers further returned to said first volume by said bias upon loss of said heat means; said generated potential rapidly decaying because of movement of said liquid metal past said electrically independent junctions.

15. In an apparatus of the class described: thermocouple means having hot and cold junctions; one said junction formed between a conductive fluid and metallic enclosure means; means for applying heat to said hot junction and thereby generating a potential between said hot and cold junctions resulting in a current flow between said junctions in said conductive fluid; magnetic flux generating means adjacent said enclosure means and passing said flux across said fluid; and a variable volume chamber connected to said enclosure means and containing said fluid; said current and said flux creating a force in said fluid to propel said fluid in said enclosure means; said movement of said fluid changing the volume of said variable volume chamber; upon loss of means for applying heat said conductive fluid flowing back past said hot junction thereby rapidly cooling said junction and rapidly causing the decay of said current flow.

References Cited in the file of this patent

UNITED STATES PATENTS

| | | |
|---|---|---|
| 2,269,411 | Newton | Jan. 6, 1942 |
| 2,615,940 | Williams | Oct. 28, 1952 |
| 2,635,637 | Karrer | Apr. 21, 1953 |
| 2,748,710 | Vandenburg | June 5, 1956 |

FOREIGN PATENTS

| | | |
|---|---|---|
| 111,489 | Great Britain | July 25, 1918 |